United States Patent [19]
Kajitani et al.

[11] Patent Number: 5,816,924
[45] Date of Patent: Oct. 6, 1998

[54] FLYWHEEL ASSEMBLY

[75] Inventors: Koji Kajitani; Hiroshi Mizukami, both of Neyagawa, Japan

[73] Assignee: Exedy Corporation, Neyagawa, Japan

[21] Appl. No.: 885,881

[22] Filed: Jun. 30, 1997

[30] Foreign Application Priority Data

Jul. 10, 1996 [JP] Japan ................................. 8-180941

[51] Int. Cl.$^6$ ................................................. F16F 15/12
[52] U.S. Cl. ............................ 464/66; 192/201; 192/212; 464/68
[58] Field of Search ................................. 464/63, 64, 66, 464/68; 192/201, 212; 74/574

[56] References Cited

U.S. PATENT DOCUMENTS

| | | | |
|---|---|---|---|
| 3,296,887 | 1/1967 | Larsen ........................ | 192/201 |
| 4,433,770 | 2/1984 | Loizeau et al. .............. | 464/68 |
| 4,576,267 | 3/1986 | Loizeau ...................... | 192/201 |
| 4,620,621 | 11/1986 | Kulczycki et al. ........... | 192/201 |
| 4,679,678 | 7/1987 | Habel, Jr. et al. ............ | 192/212 |
| 4,702,721 | 10/1987 | Lamarche .................... | 464/66 |
| 4,747,801 | 5/1988 | Chasseguet et al. .......... | 464/66 |
| 4,903,812 | 2/1990 | Fishcer et al. ................ | 464/63 |
| 5,697,845 | 12/1997 | Curtis .......................... | 464/68 |

*Primary Examiner*—Eileen A. Dunn
*Attorney, Agent, or Firm*—Shinyu An Intellectual Property Firm

[57] ABSTRACT

A first flywheel and a second flywheel in a flywheel assembly are configured to be connected to each other such that they rotate together with generally no relative rotation therebetween in a predetermined low RPM region. The flywheel assembly (1) includes the first flywheel (2), the second flywheel (3), a damper mechanism (5) and a lever mechanism (7). The second flywheel (3) is disposed rotatably relative to the first flywheel (2). The damper mechanism (5) elastically connects the first flywheel (2) and the second flywheel (3) to allow for limited relative rotary displacement therebetween. The lever mechanism (7) is mounted on the first flywheel (2) and pivots about a pivot bolt connected to the first flywheel (2). The lever mechanism (7) pivots between an engaged state and a disengaged state. In the engaged state, the lever mechanism (7) connects the first flywheel (2) and the second flywheel (3) such that the two flywheels may not undergo relative rotary displacement with respect to each other. The lever mechanism (7) moves to the disengaged state in response to rotation of the flywheel mechanism at a rotational speed greater than a predetermined RPM.

7 Claims, 4 Drawing Sheets

FLYWHEEL ASSEMBLY

BACKGROUND OF THE INVENTION

1. Field of the Invention

The present invention relates to a flywheel assembly, and more particularly to a flywheel assembly having a damper mechanism interposed between a first flywheel and a second flywheel.

2. Description of the Related Art

A flywheel is mounted to a crankshaft of an engine. The inertial mass of the flywheels serves to reduce the rotational vibration during operation of the engine at low speeds. Also, a starting ring gear, a clutch and the like are typically mounted on the flywheel.

A flywheel assembly is well known in which the flywheel is divided into a first flywheel and a second flywheel with a damper mechanism being interposed therebetween. The damper mechanism interposed between the first and second flywheels includes an elastic member disposed so as to be compressible in the circumferential direction when the two flywheels undergo relative rotary displacement with respect to each other. Also, there are some damper mechanisms which are provided with a friction generating mechanism which acts in parallel with the elastic member to produce a hysteresis dampening effect.

Noise and vibration problems are often produced by the drive power transmission system of vehicles and are caused by the drive train gear engagement and engagement and interaction between other mechanical portions the drive train when the vehicle is in operation. In order to reduce the noise and vibration, it is desirable to set a resonance frequency of the drive train system at a level lower than the RPM range of the engine at idling speeds by reducing torsional rigidity in the acceleration/deceleration torque ranges as much as possible. In order to reduce the torsional rigidity in the damper mechanism, there are some damper mechanism configurations where the angle displacement of the elastic member is enlarged, or a plurality of elastic members are arranged so as to act in series with each other.

On the other hand, in the above-described two-divided flywheel assembly, when the engine is started and the engine is stopped, the engine speed passes through the resonance frequency in the low RPM regions (for example, 500 RPM or less). In this case, there is a possibility that an excessively large torque variation could occur, resulting in damage to the damper mechanism or the generation of noticeable noise/vibration. In order to overcome these problems, as proposed in Japanese Patent Application Laid-Open No. Hei 5-18440, a locking mechanism is provided such that in the low RPM region, the first flywheel and the second flywheel are locked with each other for unitary rotation. However, in the higher RPM region, the locking of the two members is released to thereby bring the damper mechanism into an operable condition. The interlocking mechanism shown in Japanese Patent Application Laid-Open No. HEI 5-18440 includes a locking member for interlocking the two flywheels and an elastic member for biasing the locking member to the lock position. The locking member an arcuate shaped member disposed in two corresponding recesses, a first recess in the first flywheel and a second recess formed in the second flywheel. The locking member and the recesses are configured such that the locking member may move in a radially between a radially inward position and a radially outward position. In the radially outward position, the locking member is completely disposed in the first recess of the first flywheel. In the radially inward position, the locking member extends into the second recess of the second flywheel and partially extends into the first recess of the first flywheel, thus locking the two flywheels together. A spring biases the locking member in a radially inward position. In a low RPM region, the locking member is biased radially inward by the spring and the two flywheels are lock together. When the engine is rotating in a high RPM region, the locking member is moved radially outwardly by the centrifugal force to overcome the biasing force of the elastic member, thus unlocking the two flywheels. In the flywheel assembly disclosed in Japanese Patent Application Laid-Open No. HEI 5-18440, the recesses which retain the locking member are formed in the two flywheels. Due to the formation of these engagement portions, the structure of the overall assembly is complicated and manufacturing cost may be high. The locking member also may have a short service life due to the repeated application of the torque thereto. As well, the mechanism appears to have low reliability. Furthermore, while in the lock position, the locking member is engaged and retained by the two flywheels and therefore there are circumstances, such as constant acceleration conditions, where the locking member is unable to move to the radially outward, disengaged position.

SUMMARY OF THE INVENTION

An object of the present invention is to provide a flywheel assembly in which a first flywheel and a second flywheel may be selectively interconnected with each other to limit relative rotation therebetween in a low RPM speed region with a simple structure.

Another object of the present invention is to provide a flywheel assembly in which a first flywheel and a second flywheel are interconnected with each other unrotatably relative to each other in a low speed region with a highly reliable structure.

In accordance with one aspect of the present invention, a flywheel assembly includes a first flywheel and second flywheel disposed adjacent to the first flywheel and configured to undergo limited relative rotary displacement with respect to the first flywheel. An elastic member is disposed between the first and second flywheels limiting relative rotary displacement between the first and second flywheels. A lever mechanism is mounted on the first flywheel for pivotal movement with respect to the first flywheel, the lever mechanism being biased into engage the second flywheel, the lever mechanism being further configured to be disengaged from the second flywheel in response to centrifugal force with the first and second flywheels rotating above a predetermined RPM range. The lever mechanism includes a lever attached to the first flywheel by a pin, the pin defining a fulcrum about which lever pivots. The frictional clutch is attached to a first end of the lever and an inertia mass member is fixed to a second end of the lever. The second flywheel is formed with a circumferentially extending inner surface, the frictional clutch faces the inner surface of the second flywheel. A spring member is mounted on the first flywheel. The spring member is engaged with the inertia mass member biasing the lever such that the frictional clutch is biased toward engagement with the inner surface of the second flywheel.

During normal operation of the present invention, when the first flywheel is rotated, a torque is transmitted through the elastic members to the second flywheel. In a low RPM region, the first and second flywheels are connected such that they do not undergo relative rotary displacement with respect to each other by the engagement of the lever mechanism. For this reason, when the resonant frequency RPM is passed, there is no relative rotary displacement between the two flywheels. Therefore, excessive torque variation is prevented upon the passing the resonant frequency. Damage to the elastic members or the like and the noise/vibration are prevented.

When the predetermined RPM is exceeded, the connection between the first and second flywheels is released by the centrifugal force acting on the lever mechanism. As a result, the first and second flywheels may be rotated relative to each other.

DESCRIPTION OF THE PREFERRED EMBODIMENTS

The present invention will now be described with reference to the accompanying drawings.

Figure 1:
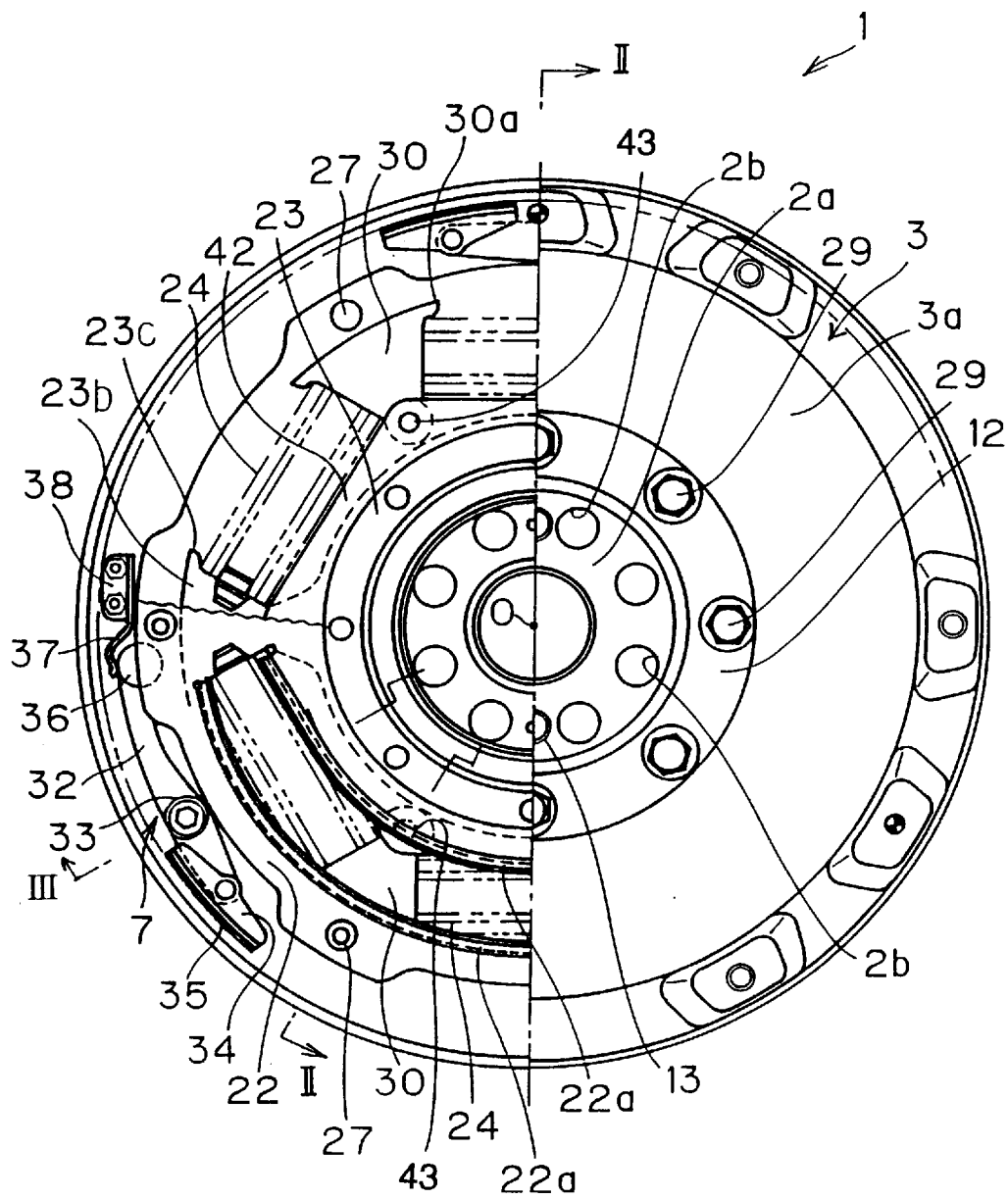
FIG. 1 is a part elevation, part cutaway view showing a flywheel assembly in accordance with one embodiment of the present invention.
Figure 2:
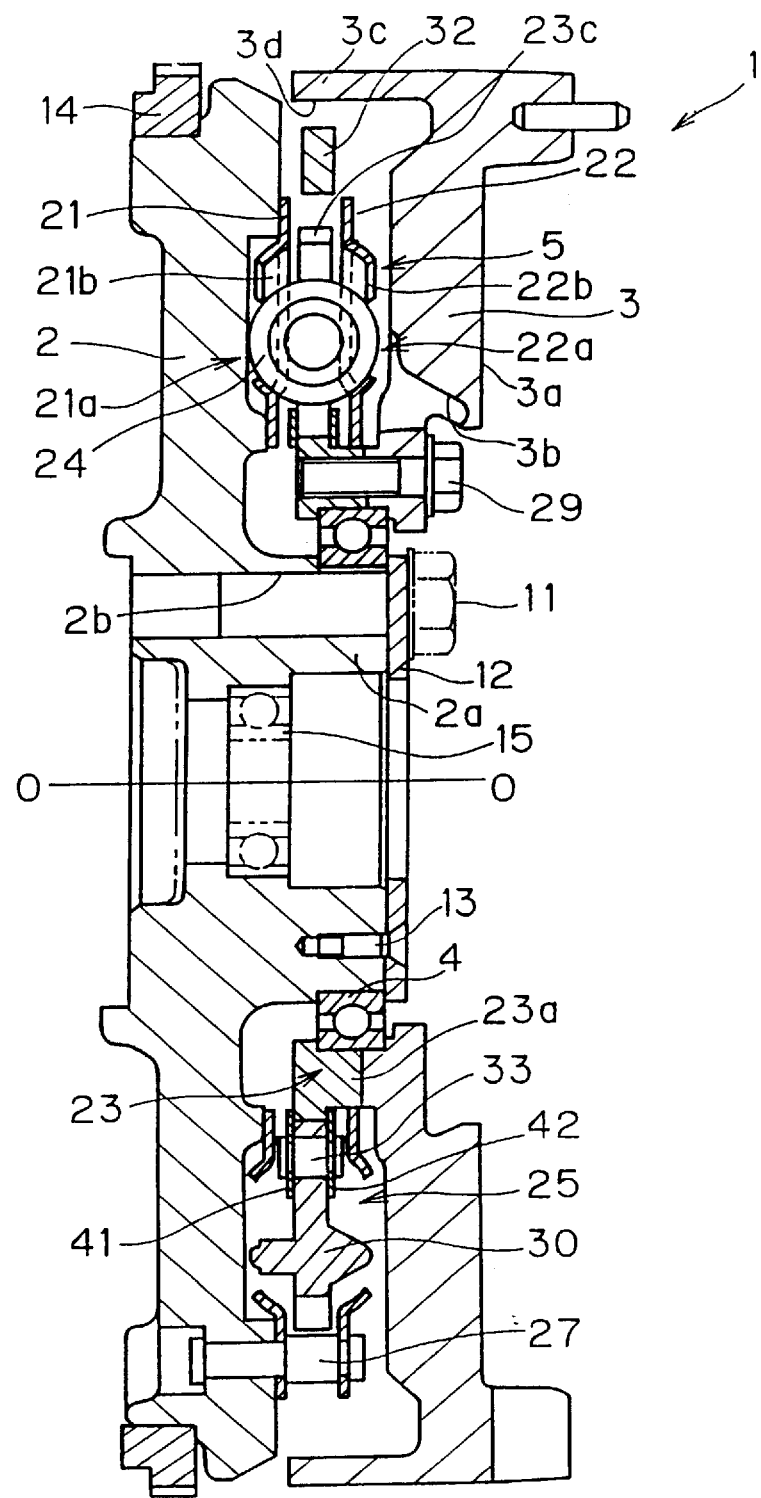
FIG. 2 is a cross-sectional view of the flywheel assembly taken along the line II—II of FIG. 1.
Figure 3:
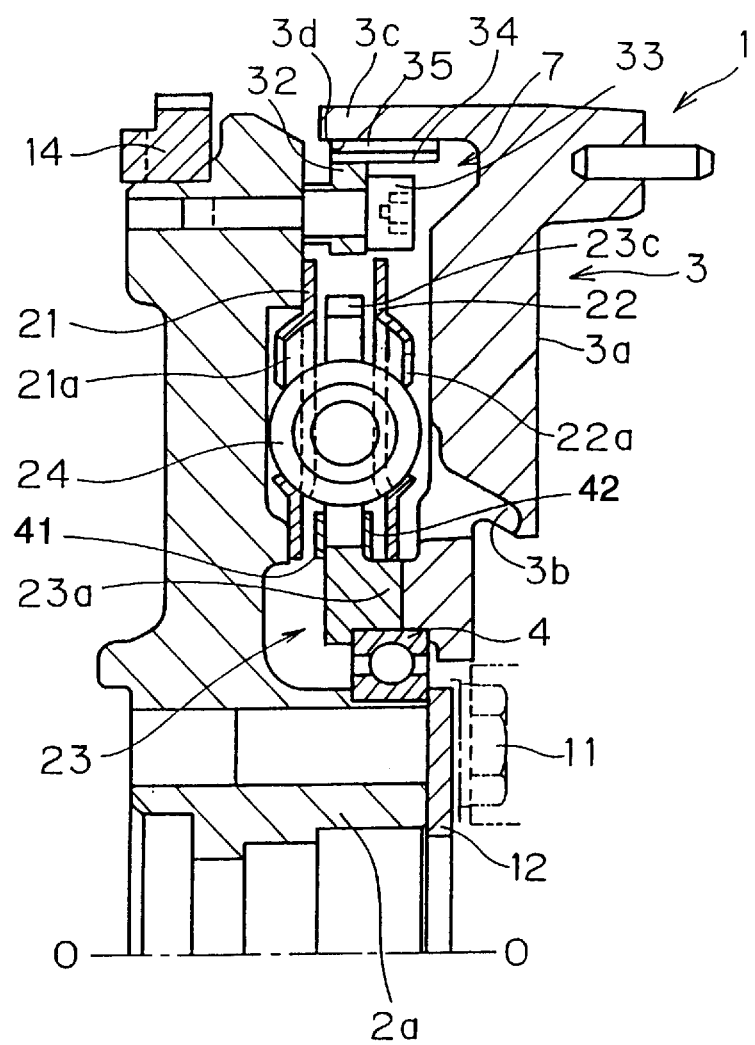
FIG. 3 is a partial cross-sectional view of the flywheel assembly taken along the line III-O of FIG. 1.
Figure 4:
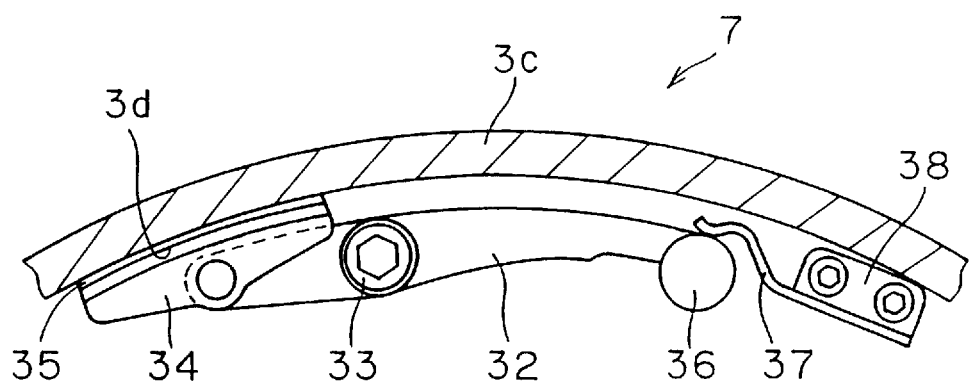
FIG. 4 is a fragmentary, part cross-section, part plan view of the flywheel assembly showing details of a lever mechanism in an engaged position.

FIGS. 1, 2, 3, 4 and 5 show a flywheel assembly 1 in accordance with one embodiment of the invention. The flywheel assembly 1 is configured to be mounted to a crankshaft (not shown) of an engine (not shown), and serves to transmit torque to a transmission through a clutch device (not shown) that may be attached to the flywheel assembly. With reference now to FIG. 2, the unillustrated engine would be disposed to the left of the flywheel assembly 1 and therefore, hereinafter, the left side of FIG. 2 will be referred to as the engine side. The transmission (not shown) would be disposed to the left side of the flywheel assembly 1 in FIG. 2 and therefore, the right side of FIG. 2 will hereinafter be referred to as the transmission side.

The flywheel assembly 1 includes a first flywheel 2, a second flywheel 3, a damper mechanism 5 and several lever mechanisms 7.

The first flywheel 2 is a disc-like member which has, in a central portion thereof, a sleeve-like central boss 2a extending toward the transmission side. Holes 2b are formed in the central boss 2a through which crank bolts 11 are inserted. It should be noted that the bolts 11 are shown in FIG. 2, but have been omitted in FIG. 1 to provide greater clarity. A bearing 15 is fixed to an inner circumferential surface of the central boss 2a. The bearing 15 serves to relatively rotatably support a tip end of a main drive shaft (not shown) extending from the transmission side. A bearing 4 is fixed to an outer circumferential surface of the central boss 2a. In order to retain the bearing 4, a disc-like fastening plate 12 is fixed to the end of the central boss 2a by bolts 13. A ring gear 14 is fixed to an outer circumference of the first flywheel 2.

The second flywheel 3 is a disc-like member having an inner diameter that is larger than the inner diameter of the first flywheel 2. The inner circumferential portion of the second flywheel 3 is supported on the central boss 2a of the first flywheel 2 through the bearing 4, thus allowing relative rotation between the first flywheel 2 and the second flywheel 3.

A flat frictional surface 3a is formed on the transmission side of the second flywheel 3. Furthermore, a plurality of air holes 3b are formed radially inward from the frictional surface 3a. The air holes 3b penetrate the second flywheel 3 in the axial direction. A cylindrical projecting portion 3c extending toward the engine side, i.e., toward the first flywheel 2, is formed on a radially outward circumferential portion of the second flywheel 3. The inner circumferential surface of the cylindrical projecting portion 3c defines a frictional surface 3d.

The damper mechanism 5 is disposed in a space defined between the first flywheel 2 and the second flywheel 3. The damper mechanism 5 connects the first flywheel 2 and the second flywheel 3 to each other limiting relative rotary displacement with respect to each other within a predetermined angular displacement range. The damper mechanism 5 includes a first drive plate 21, a second drive plate 22, a driven plate 23, a plurality of coil springs 24 and a float member mechanism 25. The first drive plate 21 and the second drive plate 22 are disc-like members, respectively, and disposed at a predetermined interval in the axial direction. The outer circumferential portions of the first drive plate 21 and the second drive plate 22 are fixed to the first flywheel 2 by a plurality of rivets 27. The axial distance between the first drive plate 21 and the second drive plate 22 is maintained by the rivets 27. Window holes 21a and 22a extending in the axial direction are formed in radial intermediate portions of the first drive plate 21 and the second drive plate 22. Cut-out portions 21b and 22b are formed on either side the radial direction of the three window holes 21a and 22a.

The driven plate 23 is a disc-like member disposed between the first drive plate 21 and the second drive plate 22. A boss 23a is formed on the driven plate 23 and extends axially toward the transmission side. The driven plate 23 has bolt holes is formed in an inner circumferential portion thereof which extend through the axial width of the driven plate 23. Bolts 29 are threadedly engaged with the bolt holes of the boss 23a through holes formed in the inner circumferential portion of the second flywheel 3 from the transmission side. The driven plate 23 is fixed to the second flywheel 3 by the bolts 29. The inner circumferential surface of the driven plate 23 is therefore fixed to the second flywheel 3. Window holes, corresponding to the window holes 21a and 22a of the first and second drive plates 21 and 22, are formed in the driven plate 23 between support portions 23b. The window holes have no outer edges and are opened radially outwardly. The shape of these windows is defined by the three support portions 23b which extend radially outwardly are formed in the driven plate 23. The circumferential spaces between the three support portions 23b in the circumferential direction define the above-described windows. The support portions 23b have a shape similar to the letter T, with limit portions 23c formed on the radially outer most portions of the support portions 23b. The limit portions 23c extend circumferentially to partially enclose the above described windows.

Paired coil springs 24 are disposed within each window hole of the driven plate 23 and window holes 21a and 22a of the first and second drive plates 21 and 22.

The pair of coil springs 24 extend generally linearly (the coil springs 24 are generally straight and have no noticeable curvature along their axial length) in a direction tangent a circumference of the driven plate 23. The coil springs 24 could each be a single coil spring. However, each of the respective coil springs 24 could alternatively include a pair of coaxial coil springs having a large diameter and a small diameter. However, even though each coil spring 24 could includes two coaxial springs, for convenience, each of the coaxial springs 24 will be referred to as a single coil spring 24.

The float mechanism 25 is interposed between adjacent coil springs 24 disposed in each window hole. The float mechanisms 25 are intermediate joint mechanisms for transmitting the torque between the two coil springs 24. The float member mechanism 25 includes three float members 30 such that the float member 30 is centrally disposed in the window hole between adjacent support portions 23b in a torsion free state. The float mechanism 25 also includes a pair of annular plates 41 and 42. Each of the float members 30 are interposed between the two coil springs 24 in each window. Each of the float member 30 is sector-shaped in a manner similar to that of each of the support portions 23b so that the circumferential width is increased in a radially outward edge. Limit portions 30a are formed on each circumferential side of the float members 30 to extend in the circumferential direction for limiting the two coil springs 24 radially outward movement.

As shown in FIG. 1, each float member 30 is formed with a projection 30a extending on both sides in the axial direction so as to come into contact with end faces of the coil springs 24. The two annular plates 41 and 42 are disposed between the inner circumferential portions of the first and second drive plates 21 and 22 in the axial direction. A radially inward end of each of the float members 30 is fixed to the annular plates 41 and 42 by a rivet 43. The rivet 33 allows the float members 30 to undergo limited pivotal movement about the rivet 43.

The inner circumferential edges of the annular plate 42 and the second drive plate 22 are in contact with the outer circumference of the boss 23a of the driven plate 23 but may undergo limited relative rotary displacement relative thereto.

The lever mechanism 7 is a mechanism for selectively mechanically connecting the first flywheel 2 and the second flywheel 3 such that, while engaged, the lever mechanism 7 does not allow for free relative rotation between the first and second flywheels 2 and 3. The lever mechanism 7 is configured to be disengaged when a predetermined idle RPM is exceeded. There are three lever mechanisms 7 are arranged at regular intervals in the circumferential direction between the first and second flywheels 2 and 3 in the axial direction. Details of the lever mechanisms 7 are shown in greater detail in FIGS. 3, 4 and 5. All three lever mechanisms 7 are generally the same and therefore explanation will only be provided for one of the lever mechanisms 7, but will apply to all three.

The lever mechanism 7 includes a lever 32 which has an arcuate shape, a frictional clutch 34 fixed at one end of the lever 32, an inertia mass member 36 provided at the other end of the lever 32, and a spring 37 disposed in the vicinity of the inertial mass member 36. An intermediate circumferential portion of the lever 32 includes a pivot bolt 33 which defines a fulcrum. The pivot bold 33 extends through an aperture formed in the lever 32 and further extends into the first flywheel 2. The lever 32 is pivotable about the pivot bolt 33. The frictional clutch 34 faces the frictional surface 3d formed in the inner circumferential surface of the cylindrical projecting portion 3c of the second flywheel 3. Furthermore, a frictional member 35 is fixed to a surface of the frictional clutch 34 facing the frictional surface 3d. The frictional clutch 34 and the frictional member 35 have an arcuate surface along the inner circumferential surface of the cylindrical projecting portion 3c. The spring 37 is thin plate-shaped with one end being integrally provided with a plate 38. The plate 38 is fixed to the first flywheel 2 by two bolts. The other end of the spring urges the one end of the lever 32 radially inwardly. Specifically, the spring 37 urges the inertia mass portion 36 radially inwardly. As a result, the frictional clutch 34 is urged toward the frictional surface 3d of the second flywheel 3 through the lever 32 by the force of the spring 37.

The operation of the flywheel assembly 1 will now be described.

When the engine (not shown) is started, torque is transmitted from the crankshaft to the first flywheel 2. At a low RPM, centrifugal forces have little effect on the inertia mass portion 36 because of the force of the spring 37 acting on the inertia mass portion 36. Therefore, at low RPM, the frictional member 35 engages the inner circumferential surface of the cylindrical projecting portion 3c. Torque is transmitted from the first flywheel 2 to the second flywheel 3 due to the engagement of lever mechanisms 7 with the cylindrical projecting portion 3c in a low, predetermined RPM region (for example, 0 to 500 RPM). In other words, since the lever mechanisms 7 are in an engaged state, the first flywheel 2 and the second flywheel 3 rotate together as a single unit so that the damper mechanism 5 is inoperative. Since the first flywheel 2 and the second flywheel 3 do not undergo relative rotary displacement due to the lever mechanisms 7, excessive large torque variation are less likely to occur in the flywheel assembly 1 as the RPM speed of the engine passes through the resonant frequency of in the low RPM region. As a result, there is less likelihood of damage to the damper mechanism 5 and there is less likelihood that noise and or vibration will occur.

Figure 5:
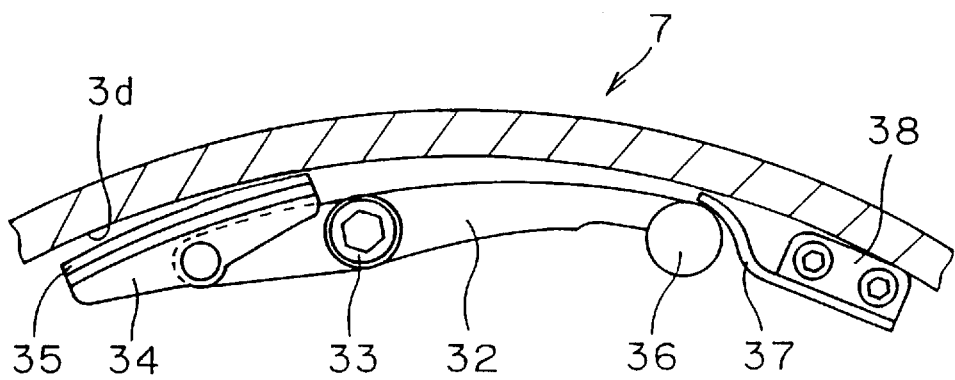
FIG. 5 is a fragmentary, part cross-section, part plan view of the flywheel assembly showing details of the lever mechanism in a partially engaged state.

As the rotational speed of the flywheel assembly 1 increases, centrifugal forces begin to act on the inertia mass portion 36 urging it radially outward against the force of the spring 37, as shown in FIG. 5. As the inertia mass portion 36 moves radially outward, the lever 32 pivots about the bolt 33 and the frictional member 35 becomes disengaged from the cylindrical projecting portion 3c. When the frictional member 35 are pivoted away from the cylindrical projecting portion 3c, the lever mechanisms 7 are in a disengaged state.

When the RPM of the engine is increased (for example, exceeding 500 RPM), the centrifugal force to be applied to the inertia mass member 36 is increased. The inertia mass member 36 is moved radially outwardly while overcoming the biasing force of the spring 37. Then, as shown in FIG. 5, the frictional clutch 34 is moved radially inwardly so that the frictional member 35 is separated away from the frictional surface 3d. Under this condition, the torque of the first flywheel 2 is transmitted to the second flywheel 3 through the dumper mechanism 5.

In general, the force of the frictional clutch 34 to be applied to the cylindrical projecting portion 3c is related to the biasing force of the spring 37 and the distance between the bolt 33 (pivot point) and the point of contact between the inertia mass member 36 and the spring 37. Thus, a large biasing force may be obtained by using a strong spring 37 and/or increasing the distance between the pivot bolt 33 and the inertia mass member 36. With the above considerations, the proper biasing of the spring 37 can be predetermined for flywheel assemblies of a variety of sizes, speeds and operating conditions.

Since the three pairs of series connected coil springs 24 are provided in the damper mechanism 5, the torsional rigidity is decreased and at the same time, the angle of relative rotary displacement between the first and second flywheels is increased. For this reason, it is unnecessary to provide the friction resistance generating mechanism, and it is possible to attenuate the torsional vibration with a small amount of frictional resistance generated between the respective components. As a result, it is possible to reduce the drive system sounds during the travel.

In the flywheel assembly according to the present invention, since it is possible to obtain the large biasing force by the lever ratio, it is possible to cause the first flywheel and the second flywheel to rotate together.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What we claim is:

1. A flywheel assembly comprising:
   a first flywheel;
   a second flywheel disposed adjacent to the first flywheel and configured to undergo limited relative rotary displacement with respect to said first flywheel;
   an elastic member disposed between said first and second flywheels limiting relative rotary displacement between said first and second flywheels; and
   a lever mechanism mounted on said first flywheel for pivotal movement with respect to said first flywheel, said lever mechanism being biased into engage said second flywheel, said lever mechanism being further configured to be disengaged from said second flywheel in response to centrifugal force with said first and second flywheels rotating above a predetermined RPM range.

2. The flywheel assembly according to claim 1, wherein said lever mechanism further comprises a frictional clutch for coupling said first flywheel and said second flywheel to each other.

3. The flywheel assembly according to claim 2, wherein:
   said lever mechanism includes a lever attached to said first flywheel by a pin, said pin defining a fulcrum about which said lever pivots, said frictional clutch is attached to a first end of said lever and an inertia mass member is fixed to a second end of said lever;
   said second flywheel is formed with a circumferentially extending inner surface, said frictional clutch faces said inner surface of said second flywheel; and
   a spring member mounted on said first flywheel, said spring member engaged with said inertia mass member biasing said lever such that said frictional clutch is biased toward engagement with said inner surface of said second flywheel.

4. The flywheel assembly according to claim 3, wherein said inner surface of said second flywheel is defined on an annular lip which extends axially from said second flywheel.

5. The flywheel assembly according to claim 4, further comprising:
   a pair of drive plates fixed to said first flywheel, said drive plates being spaced apart from each other and formed with engagement portions;
   a driven plate disposed between said drive plates having a plurality of radially extending support portions formed thereon; and
   wherein said elastic member comprises a plurality of elastic members disposed between adjacent ones of said radially extending support portions and said engagement portions.

6. The flywheel assembly according to claim 5, further comprising:
   a float body mounted between said first and second flywheels for relative rotary displacement with respect to both said first and second flywheels, said float body extending radially outward between adjacent elastic members such that said two adjacent elastic members extend between said radially extending support portions with said float body separating said two adjacent elastic members.

7. The flywheel assembly according to claim 6, wherein said float body and said radially extending support portions are formed at radial outward portions with circumferentially extending limiting portions.

* * * * *